United States Patent [19]

Treybig et al.

[11] Patent Number: 5,663,259

[45] Date of Patent: Sep. 2, 1997

[54] CURABLE COMPOSITIONS WHICH CONTAIN NETWORK POLYMERS

[75] Inventors: Duane S. Treybig, Lake Jackson; Clinton J. Boriack, Jones Creek, both of Tex.

[73] Assignee: The Dow Chemical Company, Midland, Mich.

[21] Appl. No.: 455,730

[22] Filed: May 31, 1995

[51] Int. Cl.$^6$ .................. C08F 220/08; C08F 226/02; C08F 18/24

[52] U.S. Cl. .................. 526/271; 526/312; 526/314

[58] Field of Search ................... 526/271, 312, 526/314

[56] References Cited

U.S. PATENT DOCUMENTS

| | | |
|---|---|---|
| 3,312,676 | 4/1967 | Rees. |
| 3,762,863 | 10/1973 | Charle et al.. |
| 3,915,635 | 10/1975 | Kalopissis et al.. |
| 3,976,808 | 8/1976 | Honjo et al.. |
| 4,039,331 | 8/1977 | Lee. |
| 4,302,336 | 11/1981 | Kawaguchi et al.. |
| 4,385,164 | 5/1983 | Sinclair et al.. |
| 4,710,446 | 12/1987 | Hoffmann et al.. |
| 5,089,579 | 2/1992 | Sutter et al.. |

FOREIGN PATENT DOCUMENTS 37 14 276   11/1988   Germany.

OTHER PUBLICATIONS

Kao, et al. *Kinetics of Emulsion Polymerization of Styrene—Simulation Model with Varying Free Radical Capture Efficiency.* Journal of Polymer Science, Polymer Chemistry Ed., vol. 22, pp. 3499–3519 (1984).

Jessé C.H, Hwa, William A. Fleming, and Leon Miller, Journal of Polymer Science: Part A vol. 2, pp. 2385–2400 (1964).

*Primary Examiner*—Joseph L. Schofer
*Assistant Examiner*—Wu C. Cheng

[57] ABSTRACT

A network polymer that contains:

(a) a plurality of polymer chains which are derived from one or more ethylenically-unsaturated monomer(s), and (b) at least one linking group which links the polymer chains and which contains anhydride, carbonate, or uretidinedione moieties.

The network polymer and other network polymers which contain similar dissociating groups are useful in curable formulations which contain a curable compound that contains:

(a) a central moiety, and (b) a plurality of reactive groups which are bonded to the central moiety and which react with acid, hydroxyl, or isocyanate moieties liberated by dissociation of the anhydride, carbonate, or uretidinedione moieties.

The curable composition builds viscosity more slowly and more controllably during curing than equivalent systems which do not contain the network polymer. It is useful in coatings and other uses for curable compositions.

29 Claims, No Drawings

CURABLE COMPOSITIONS WHICH CONTAIN NETWORK POLYMERS

BACKGROUND OF THE INVENTION

The present invention relates to resins useful in curable formulations, particularly for coating applications.

Coating formulations that contain curable epoxy resins, isocyanates, and other resins and their curing agents are commonly used to put decorative and/or protective coatings on indoor and outdoor articles. These formulations are usually applied as powders or as solutions of curable resin in aqueous or organic solvents. Solutions are commonly applied by spraying, brushing, dipping, rolling and other methods. Powders are commonly applied by fluidized bed or electrostatic spraying of powder onto a heated substrate which causes the powder to melt, flow, consolidate and cure.

Viscosity (or melt viscosity in the case of powder coating formulations) is a critical characteristic in solvent-borne and powder-coating formulations. The viscosity is ideally low enough so that the formulation flows and spreads evenly before it cures, in order to provide a smooth, even appearance and a surface which is free of holes and other flaws. High viscosity also makes it more difficult to obtain adequate wetting using the formulation. Inadequate wetting may reduce coating adhesion or hurt other coating properties.

Viscosity control is becoming even more important because of current attempts to limit emissions of volatile organic compounds (VOC). In order to reduce their use of VOC, coaters either use formulations which contain higher solid concentrations and lower solvent concentrations than previously used, or substitute powder coatings into applications where they were not used previously because of uneven appearance. In both instances, the higher viscosity of the formulation or melt makes it more difficult to apply a smooth coating with even appearance.

The viscosity of many formulations decreases as the formulation is heated for curing, providing an opportunity for the formulation to flow and cover the surface. However, the formulation builds molecular weight rapidly as it cures, so that the viscosity quickly rises again. The coating formulation would have more opportunity to spread evenly before it cures if the buildup of viscosity were slowed.

Several methods are known to slow the reaction of curable resin and curing agent. For instance, the formulation may contain less reactive reagents or latent catalysts. Those methods control the buildup of viscosity, but also lengthen the time needed to complete the curing reaction. This is economically undesirable, because the cure requires longer residence time and more energy in curing ovens.

What is needed is a relatively low viscosity curable composition which builds viscosity in a slower, more controlled fashion, but completes the curing cycle in about the same total time.

SUMMARY OF THE INVENTION

One aspect of the present invention is a network polymer comprising:
(1) a plurality of polymer chains which are derived from one or more ethylenically-unsaturated monomers; and
(2) one or more linking groups, which: (a) contain anhydride, carbonate or uretidinedione moieties; and
(b) link two polymer chains,
wherein the network copolymer: (A) contains less than 0.5 equivalents of pendant carboxylic acid per equivalent of anhydride when the linking group contains an anhydride moiety, and (B) is soluble up to at least 20 weight percent solids in at least one aromatic or aprotic polar organic solvent.

A second aspect of the present invention is a process to make the network polymer, comprising the step of copolymerizing:
(1) one or more ethylenically-unsaturated monomers; and
(2) one or more linking compounds, which contain at least two ethylenically-unsaturated aliphatic moieties linked by anhydride, carbonate or uretidinedione moieties,
under starved reaction conditions.

A third aspect of the present invention is a curable composition which comprises:
(a) a network polymer that contains:
(1) a plurality of polymer chains which are derived from one or more ethylenically-unsaturated monomer(s), and
(2) at least one linking group which:
(i) links two polymer chains, and
(ii) contains a dissociating group that dissociates to form a plurality of first reactive groups; and
(b) a curable compound which contains a plurality of second reactive groups, which react with the first reactive groups to cure the composition.

For the purposes of this application, "dissociate" and "dissociating" mean that either: (1) the dissociating group divides by action of heat, solvent, reagent and/or catalyst to form two reactive sites; or (2) a part of the dissociating group reacts with the curable compound in the same manner as a first reactive group, and that reaction cleaves the dissociating group to form another first reactive group.

A fourth aspect of the present invention is a method to use a composition as previously described comprising the steps of: (1) coating a substrate with the composition of the present invention; and (2) maintaining the coated substrate at a temperature and for a time sufficient to cure the coating.

A fifth aspect of the present invention is a coated article comprising:
(1) a substrate, and
(2) a coating, which contains a cured composition of the present invention, adhered directly or indirectly to the substrate.

Network polymers of the present invention may be used in compositions of the present invention. Compositions of the present invention exhibit slower growth in molecular weight and viscosity than equivalent compositions which use conventional curable agents instead of the network polymer. Some compositions may exhibit a reduction in viscosity during the initial stages of cure. The compositions can be used in the method of use of the invention in order to make the coated articles of the invention.

DETAILED DESCRIPTION OF THE INVENTION (A) Network Polymers

The present invention uses a network polymer which contains chains of polymer derived from ethylenically-unsaturated monomers. The polymer chains are linked by pendant linking groups which contain dissociating moieties. (For further information and illustration of network polymers, see Vol. 4, *Encyclopedia of Poly. Sci. & En.*, "Cross-linking," at 350–395 and "Cross-linking Reversible," at 395–417 (1986); and Vol. 10, *Encyclopedia of Poly. Sci. & Eng.*, "Networks," at 95–112 (J. Wiley & Son 1987), which are incorporated herein by reference.)

An example of such a network polymer is illustrated in Formula I:

FORMULA I

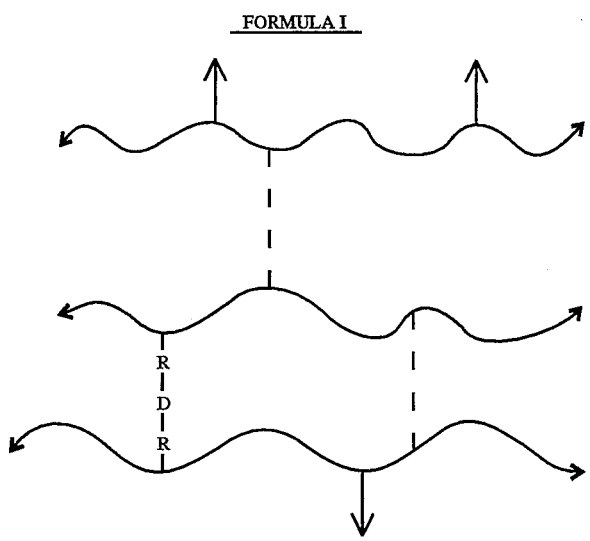

wherein:
"∽∽" represents a polymer chain derived from one or more ethylenically-unsaturated monomers;
each R independently represents a bond or a divalent organic moiety;
each D represents a dissociating moiety; and
the arrows "→" indicate that the network polymer may optionally continue further in either dimension with further polymer chains and further cross-links to other polymer chains. The group:

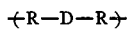

is collectively the linking group.

The polymer chains are derived from ethylenically-unsaturated monomers, such as lower ($C_1$–$C_6$) alkenes (for instance, ethylene, propylene, butylene), vinyl chloride, vinyl acetate, vinylidene chloride, styrenes (for instance, styrene or alkylstyrene), acrylic or methacrylic acid, esters of acrylic or methacrylic acid, nitriles of acrylic or methacrylic acid, or amides of acrylic or methacrylic acid, and mixtures thereof. The polymer chains are preferably polymers or copolymers of lower ($C_1$–$C_6$) alkenes, lower ($C_1$–$C_6$) alkyl esters of acrylic or methacrylic acid, and/or styrenes. The polymer chains are most preferably copolymers of two or more of those preferred monomers. More specific examples of the monomers are given in the discussion on processes to make the network polymer.

The polymer chains are preferably substantially inert with respect to the curable compound under curing conditions. Preferably, no more than 5 percent of the repeating units in the polymer chain contain pendant acid, amine, amide or hydroxyl groups; more preferably no more than about 1 percent do; and most preferably no more than about 0.1 percent do. The equivalent ratio of (pendant acid, amine, amide or hydroxyl groups):(dissociating moieties) in the network polymer is preferably less than 0.5:1, more preferably less than 0.2:1, more highly preferably less than 0.1:1, and most preferably less than 0.05:1. Ideally, the equivalent ratio is about 0:1.

The polymer chains are linked together by linking groups (L) which contain dissociating moieties (D). The dissociating moiety (D) dissociates to provide two reactive sites (hereinafter called "first reactive groups"). The first reactive groups are preferably: isocyanate groups, carboxylic acid groups, sulfonic acid groups, amine groups or hydroxyl groups. The first reactive groups are more preferably isocyanate groups or carboxylic acid groups; and are most preferably carboxylic acid groups. The dissociating moieties (D) are preferably: anhydride moieties, carbonate moieties, uretidinedione moieties, peroxide moieties, disulfide moieties, sulfate diester moieties, siloxy moieties, phosphonic diester moieties, carbonate anhydride moieties, N-hydroxyl imide moieties, ketene-acetal moieties, metal carboxylate moieties, or combinations thereof. The dissociating moieties are more preferably anhydride moieties, carbonate moieties or uretidinedione moieties; and are most preferably anhydride moieties.

Examples of suitable dissociating moieties (D) are illustrated in Formula II.

| FORMULA II | |
|---|---|
| $\begin{matrix} O & O \\ \parallel & \parallel \\ -C-O-C- \end{matrix}$ | anhydride |
| $\begin{matrix} O \\ \parallel \\ -O-C-O- \end{matrix}$ | carbonate |
| $\begin{matrix} O \\ \parallel \\ -N \quad N- \\ \parallel \\ O \end{matrix}$ | uretidinedione |
| $\begin{matrix} O & & O \\ \parallel & & \parallel \\ -C-O^{\ominus}M^{\oplus}O^{\ominus}-C- \end{matrix}$ | metal carboxylate |
| $\begin{matrix} O \\ \parallel \\ -O-S-O- \\ \parallel \\ O \end{matrix}$ | sulfate ester |
| $\begin{matrix} R^1 \\ \mid \\ -O-Si-O- \\ \mid \\ R^1 \end{matrix}$ | siloxy |
| $\begin{matrix} O \\ \parallel \\ -O-P-O- \\ \mid \\ OR^1 \end{matrix}$ | phosphonic diester | wherein M is a divalent metal such as zinc, iron, magnesium, copper, calcium or nickel; $R^1$ is hydrogen or a lower alkyl group; and all other characters have the meanings previously given.

The dissociating moiety may optionally be bonded directly to the polymer backbone, as exemplified in Formula III(a); or it may optionally be linked to the polymer backbones by a pendant divalent organic moiety (R), as exemplified in Formula III(b). (In Formulae III(a) and (b), the dissociating group is an anhydride group. Other dissociating groups may be substituted in its place.)

FORMULA III(a)

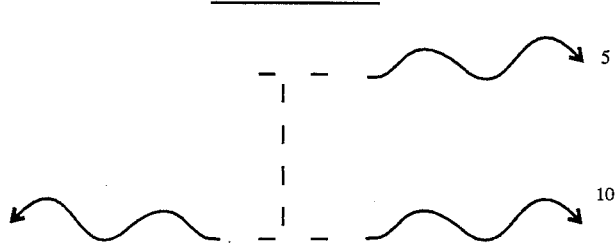

FORMULA III(b)

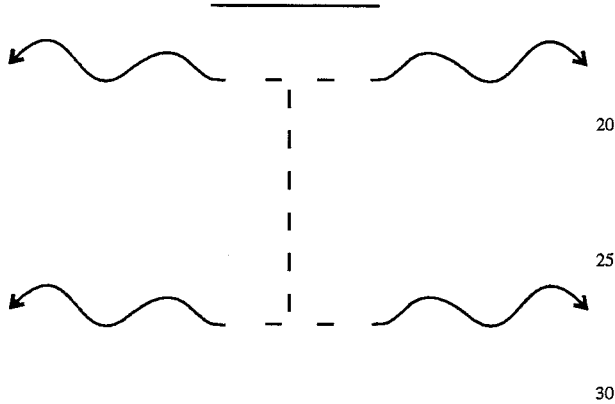

The divalent organic moiety (R) is preferably an alkylene ester moiety (—COOR$^2$—, wherein R$^2$ is an alkylene group), an alkylene moiety, or an arylene moiety. The divalent organic moiety is highly preferably an alkylene ester moiety or a phenylene moiety, is more preferably a lower alkylene ester moiety, and is most preferably a 2-ethylene-ester moiety. R$^1$ is hydrogen or a lower (C$_{1-6}$) alkyl group, and is preferably hydrogen or a methyl group.

For example, Formula III(c) illustrates a linking group (L) in which the dissociating moiety (D) is an anhydride group and the divalent organic moieties (R) are 2-ethylene-ester moieties.

FORMULA III(c)

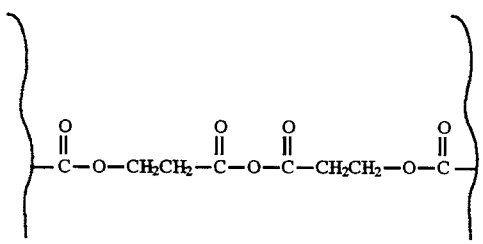

The basic network copolymer structure may have several more complex variations. For instance:

(1) A single linking group (L) may optionally contain two or more dissociating moieties (D) linked by a divalent organic moiety (R$^2$), as illustrated in Formula IV:

FORMULA IV

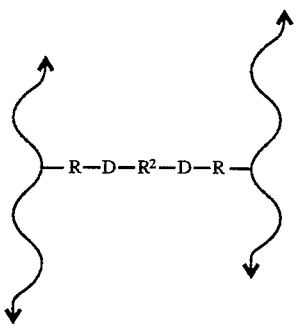

The divalent organic moiety is preferably alkyl, aromatic or alkyl-aromatic and preferably contains 1–12 carbon atoms and more preferably contains 2–6 carbon atoms. Each linking group (L) preferably contains a single dissociating moiety (D), and no R$_2$ moiety.

(2) The network polymer may optionally further contain linking groups which do not dissociate. For instance, polymer chains may be linked by groups derived from divinylbenzene, allyl methacrylate or vinyl ester resin. Preferably, the concentration of non-dissociating cross-links is minimized. The molar ratio of (non-dissociating crosslinks):(dissociating crosslinks) is preferably from 0:1 to 1:1, more preferably from 0:1 to 0.5:1, more highly preferably from 0:1 to 0.2:1, and most preferably from 0:1 to 0.1:1. Optimally, the network copolymer contains essentially no non-dissociating cross-linkers.

(3) The network polymer may contain two or more different types of linking groups (L), such as containing both anhydride linking groups and carbonate linking groups.

Other structural variations which are also within the scope of the invention will be obvious to persons of ordinary skill in the art.

The number average molecular weight of the network polymer is preferably at least about 1000, and more preferably at least about 1500. It is preferably no more than about 5000. The weight average molecular weight of the network polymer is preferably at least about 2000, more preferably at least about 5000, and most preferably at least about 15,000. It is preferably no more than about 100,000. The ratio of weight average molecular weight to number average molecular weight is preferably at least about 3, more preferably at least about 5 and most preferably at least about 10. (Molecular weights for the purposes of this discussion are measured by gel permeation chromatography (GPC) using polystyrene standards at 35° C., tetrahydrofuran as the eluent, μ-STYRAGEL columns and a differential refractometer detector.)

Within network polymers of the present invention, preferably at least about 1 percent of repeating units in the polymer chains are bonded to linking groups (L), more preferably at least about 5 percent of repeating units in the polymer chains are bonded to linking groups (L), and most preferably at least about 15 percent of repeating units in the polymer chains are bonded to linking groups (L). Preferably no more than 50 percent of repeating units in the polymer chains are bonded to linking groups (L) and more preferably no more than about 25 percent of repeating units in the polymer chains are bonded to linking groups (L). The average weight of network polymer per equivalent of dissociating moiety is preferably at least about 300, more preferably at least about 900, and most preferably at least about 1100. It is preferably no more than about 5000, more preferably no more than about 2000, and most preferably no more than about 1500.

For some purposes, it may be useful to know the average molecular weight or equivalent weight of the network polymer after the dissociating groups have been dissociated. Dissociating may be accomplished by known methods. For instance, anhydride groups are dissociated by treating with aqueous hydrogen chloride and methanol, and uretidinedione groups are dissociated by heating to at least 125° C. to 135° C. The weight average molecular weight of the dissociated network polymer is preferably at least about 1000, and more preferably at least about 3000. The weight average molecular weight of the dissociated network polymer is preferably no more than about 5000, and more preferably no more than about 3000. The average weight per equivalent of first reactive group is preferably at least about 150, more preferably at least about 450, and most preferably at least about 550. It is preferably no more than about 2500, more preferably no more than about 1000, and most preferably no more than about 750.

An important use for the network polymer is in curable formulations with other compounds. Therefore, the network polymer is preferably soluble in a curable compound or in a solvent which will dissolve a curable compound. For instance, the network polymer is preferably completely soluble in a stoichiometrically equivalent quantity of molten or liquid glycidyl methacrylate (GMA) copolymer, epoxy resin, polyamine, polyol, polyester or polyisocyanate. Alternatively, the network polymer is preferably soluble up to at least about 30 weight percent solids in at least one organic solvent, preferably a polar, aprotic solvent or an aromatic solvent.

(B) Processes to Make Network Polymers

Network polymers used in the present invention are preferably made by free-radical copolymerization of:

(1) ethylenically-unsaturated monomers; and (2) linking monomer that contains two ethylenically-unsaturated moieties linked by a linking group (L) which contains a dissociating moiety (D).

The ethylenically-unsaturated monomers were previously discussed in describing the polymer chains of the network polymer. Examples of suitable monomers include ethylene, propylene, butylene, styrene, vinyltoluene, vinyl chloride, vinylidene chloride, 4-vinylanisole, acrylonitrile, vinyl oxazoline, vinyl acetate vinyl propionate, n-butyl vinyl ether, lauryl vinyl ether, methyl acrylate, ethyl acrylate, n-propyl acrylate, isopropyl acrylate, butyl acrylate, hexyl acrylate, octyl acrylate, nonyl acrylate, decyl acrylate, lauryl acrylate, benzyl acrylate, cyclohexyl acrylate, methyl methacrylate, ethyl methacrylate, propyl methacrylate, isopropyl methacrylate, n-butyl methacrylate, hexyl methacrylate, octyl methacrylate, nonyl methacrylate, decyl methacrylate, lauryl methacrylate, benzyl methacrylate, cyclohexyl methacrylate, methyl crotonate and the like.

The linking monomer is preferably represented by Formula V(a) and more preferably represented by Formula V(b):

FORMULA V(a)

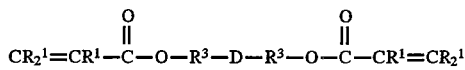  (a)

-continued
FORMULA V(a)

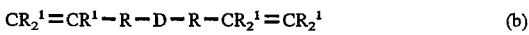  (b)

wherein $R^3$ is a lower alkylene group (preferably an ethylene group) and all other moieties have the definitions previously given. These linking monomers can be made by the processes set out in Formulae VI(a)–(g):

FORMULA VI

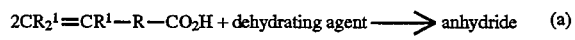  (a)

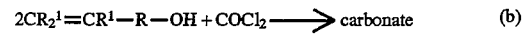  (b)

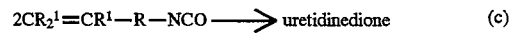  (c)

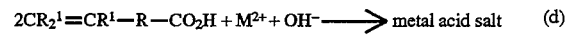  (d)

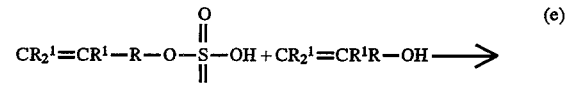  (e)

sulfate ester

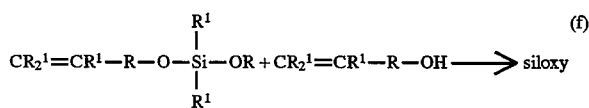  (f)

siloxy

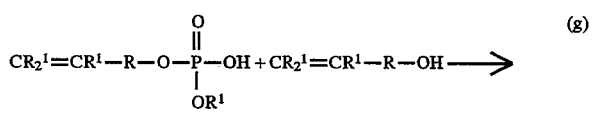  (g)

phosphonic diester

The foregoing reactions are generally described in the following references, which are incorporated herein by reference:

(a) G. M. Loudon, *Organic Chemistry*, at 1015–16 (Addison-Wesley Publ. 1984).

(b) J. March, *Advanced Organic Chemistry* (2d Ed.) at 361, 649 (McGraw-Hill Book Co. 1977).

(c) G. Oertel, *Polyurethane Handbook* at 15, 79 (Hanser Publ. 1985).

(d) R. Morrison & R. Boyd, *Organic Chemistry* (5th Ed.) at 822–29 (Allyn & Bacon, Inc. 1987).

(e) A. Vogel, *Practical Organic Chemistry* (3d Ed.) at 303 (J. Wiley & Sons 1966).

(f) E. Colvin, *Silicon in Organic Synthesis* (Butterworths).

(g) G. Kosoloapoff & L. Maier, *Organic Phosphorus Compounds* (J. Wiley & Sons 1972).

Examples of suitable linking monomers include methacrylic anhydride, acrylic anhydride, crotonic anhydride, bis-(2-methylallyl)carbonate, and the uretidinedione of 2-cyanoethyl acrylate or 2-cyanoethyl methacrylate.

The molar ratio of linking monomers to ethylenically-unsaturated monomers is preferably at least about 1:200, more preferably at least about 1:10 and most preferably at least about 1:4. It is preferably no more than about 1:1 and most preferably no more than about 1:2. The weight ratio of linking monomers to other monomers is preferably at least about 5:95, more preferably at least about 15:85, and most preferably at least about 30:70. The weight ratio is preferably no more than about 60:40.

The reaction conditions for free-radical polymerization of unsaturated monomers are well known. See Vol. 13, *Encyclopedia Poly. Sci. & Eng.*, "Radical Polymerization," at 708–867 (J. Wiley & Sons 1988), which is incorporated herein by reference. The mixture of monomers is heated in the presence of a free-radical initiator, preferably in a solvent or in an emulsion. The initiators are usually peroxide compounds or azo compounds. Suitable initiators, solvents, chain transfer agents and emulsifiers are commercially available and familiar to persons of ordinary skill in the art. The concentration of initiator is preferably about 0.5 to 10 weight percent, based upon the weight of the unsaturated monomers. For higher molecular weight network polymer, the concentration of initiator is more preferably about 1 to 4 weight percent, and for lower molecular weight network polymer, the concentration of initiator is more preferably about 4 to 8 weight percent.

Special polymerization conditions may be needed to make some of the network polymers. When methacrylic anhydride and related monomers are used in ordinary free-radical polymerization, they frequently do not form a network polymer of the present invention. Instead, the methacrylic anhydride forms a linear polymer chain having a cyclic anhydride structure incorporated within the backbone. See Charle et al., U.S. Pat. 3,762,863 (Oct. 2, 1973), which is incorporated herein by reference. These polymers do not provide the same effect as the network polymers of the present invention.

Cyclization is minimized and formation of the network structure is maximized by running the polymerization with vigorous agitation under "starved" conditions, in which monomers mixed with initiators are added to the reaction mixture continuously or intermittently in portions over a length of time. The time period is preferably at least about 2 hours, more preferably at least about 4 hours and most preferably at least about 8 hours. The time period is preferably no more than about 20 hours, more preferably no more than about 16 hours, and most preferably no more than about 10 hours. The reaction temperature is preferably high enough to encourage a quick reaction of the monomers once they are added to the reaction mixture. The reaction temperature is preferably 100° C. to 200° C., more preferably 125° C. to 175° C. and most preferably about 150° C. Examples of suitable solvents include high boiling aromatic compounds (such as xylene, ethylbenzene, or AROMATIC 100 solvent from Exxon Chemical Corp) and liquid, high-boiling esters (such as ethyl acetate, propyl acetate, butyl acetate, amyl acetate, propylene glycol methyl ethyl acetate, or DOWANOL PM* solvent. (*—trademark of The Dow Chemical Company.)

Alternative processes to make the network polymers are described in several publications. See Rees, U.S. Pat. 3,312,676 (Apr. 4, 1967) and Vol. 4, *Encyclopedia Poly. Sci. & Eng.*, "Cross-linking, Reversible," at 395–417, which are incorporated herein by reference. For instance, the Rees patent describes a process to link ethylene-methacrylic acid copolymers by reacting with acetic anhydride.

(C) Formulations Containing Network Polymers

The network polymer is preferably mixed into a composition with a curable compound which can cure by reaction with the network polymer. The curable composition optionally further contains any of the following: solvents, catalysts, fillers, pigments, flow-modifiers, wetting agents, stabilizers, flame retardants, and other common additives for curable formulations.

The curable compound contains:

(1) a plurality of reactive groups (hereinafter called "second reactive groups") which are selected to cure by reaction with the first reactive groups formed when the dissociating groups in the network polymer dissociate; and (2) a central moiety to which a plurality of the second reactive group is bonded.

Examples of preferred second reactive groups include: epoxy and glycidyl moieties; isocyanate moieties; amine moieties; hydroxyl moieties; thiol moieties; carboxylic acid moieties and amide moieties. The preferred selection within this group depends upon the first reactive groups formed by dissociation of the network polymer. The second reactive groups are preferably epoxy groups, when the first reactive groups are acid, isocyanate or hydroxyl groups. The second reactive groups are preferably amine groups or hydroxyl groups, when the first reactive groups are isocyanate or acid moieties.

The curable compound preferably contains on average more than 1.5 second reactive groups per molecule, more preferably at least about 1.8, and more highly preferably at least about 2. Many curable compounds most preferably contain on average more than 2 second reactive groups per molecule. Curable compounds which are not polymers or oligomers preferably contain no more than about 10 second reactive groups, more preferably no more than about 4 second reactive groups, and most preferably no more than about 3 second reactive groups.

The second reactive groups are bonded to a central moiety. The central moiety is preferably essentially inert under curable conditions. Examples of suitable central moieties include phenylene rings, biphenylene moieties, bis(phenylene)alkane moieties, lower alkylene moieties, poly(alkylene oxide) moieties, polyester or polyacrylate oligomers, polymers or copolymers, and combinations thereof. The central moiety is preferably an alkyl group, an aromatic group, an alkaryl group, or a copolymer containing alkyl acrylate or alkyl methacrylate.

The following are preferred examples of curable compounds: glycidyl methacrylate (GMA) copolymers, epoxy resins, polyamines, polyols and polyisocyanates. Of course, the best selection within those preferred examples shall vary depending upon the network polymer selected. The molecular weight of the curable compound is preferably selected so that the curable compound is liquid or is soluble in common solvents with the network polymer at temperatures at which the composition is used. The number average molecular weight of the curable compound is preferably at least about 100 and preferably no more than about 10,000.

GMA copolymers preferably contain at least about 1 weight percent GMA, more preferably at least about 10 weight percent, and most preferably at least about 30 weight percent. They preferably contain no more than about 80 weight percent GMA, more preferably no more than about 60 weight percent, and most preferably no more than about 40 weight percent. The GMA is preferably copolymerized with ethylenically-unsaturated comonomers as described previously in describing the network polymer and methods to make it. The comonomers are more preferably selected from lower alkyl acrylates or methacrylates and styrene. The number average molecular weight of the GMA copolymer is preferably at least about 1500, and more preferably at least about 2500. It is preferably no more than about 6000, and more preferably no more than about 4000.

Liquid epoxy resins and advanced epoxy resins are preferably poly(glycidyl ethers) or poly(glycidyl esters). The poly(glycidyl ether) is preferably derived from a polyhydric phenol (such as resorcinol, hydroquinone, catechol, bisphenol A, bisphenol F, a novolac resin, a trisphenol resin, or a halogenated variation of one of those resins), but it may also be derived from an aliphatic polyol (such 2,2-bis-(4-hydroxycyclohexyl) propane or a poly(alkylene oxide)). The glycidyl ester is preferably derived from a diacid such as 1,2-cyclohexane-dicarboxylic acid. The formula weight of non-halogen atoms per epoxide equivalent in the epoxy resin is preferably at least about 90 and more preferably at least about 160. It is preferably no more than about 500, and more preferably no more than about 250. Many suitable epoxy resins are commercially available, and others can be made by known processes such as those described in Tanaka, *Epoxy Resins* (2d *Ed.*), "Synthesis & Characteristics of Epoxides, " at 9–283 (Marcel Dekker 1988), which is incorporated herein by reference.

Polyisocyanates are preferably derived from polyamines by phosgenation. Examples of suitable polyisocyanates include: methylene di(phenylene isocyanate) (MDI), tolylene diisocyanate (TDI), naphthalene diisocyanate, hexamethylene diisocyanate and isophorone diisocyanate. Some useful polyisocyanates are commercially available. Useful polyisocyanates and processes to make them are described in many publications, such as G. Oertel, *Polyurethane Handbook* at 12–15, 62–73 (Hanser Publ. 1985); and Vol. 8, *Encyclopedia Poly. Sci. & Eng.*, "Isocyanate-Derived Polymers," at 448–453 (J. Wiley & Sons 1987), which are incorporated herein by reference.

A wide variety of diamines and other polyamines which are useful as curable compounds are commercially available, and others can be made by known processes such as by hydrogen reduction of nitrated compounds. Examples of suitable polyamines include phenylenediamine, methylene dianiline, ethylenediamine, propylenediamine, triaminobenzene, toluenediamine, 1,6-hexanediamine, isophoronediamine, and amine-containing oligomers such as are described in Vol. 11, *Encyclopedia Poly. Sci. & Eng.*, "Polyamines and Polyquaternary Ammonium Salts," at 489–507 (J. Wiley & Sons 1988), which is incorporated herein by reference.

A wide variety of polyols which are useful as curable compounds are commercially available, and others can be made by known processes. Examples of suitable polyols include lower molecular weight polyols, such as glycerine, butanediol, ethylene glycol, resorcinol, hydroquinone, catechol, bisphenol A, bisphenol F or 2,2-bis-(4-hydroxycyclohexyl)propane, and higher molecular weight polyols, such as poly(alkylene oxide), polyester polyols, polycaprolactone, acrylic polyols, phenoxy resin, novolac resin, and trisphenols.

The curable composition preferably contains either: (a) a network polymer which contains anhydride linking groups and either an epoxy resin or a polyol; (b) a polyamine or polyol and a network polymer which contains uretidinedione linking groups; or (c) a network polymer which contains carbonate linking groups and either a polyamine or a polyol. It most preferably contains a network polymer which contains anhydride linking groups and an epoxy resin.

The composition optionally further contains chain extenders or curing agents for the curable compound. These chain extenders and curing agents preferably contain on average at least about 2 first reactive groups. They preferably contain on average no more than about 10 first reactive groups and most preferably no more than about 4 first reactive groups. The first reactive groups may be either the same as, or different from, the first reactive groups in the dissociated network polymer. The chain extender or curing agent preferably has a lower number average molecular weight than the network polymer. Its weight per equivalent of first reactive group is preferably no more than about 500, more preferably no more than about 300, and most preferably no more than about 250. Its molecular weight is preferably at least about 100. When the curable compound is epoxy resin, then examples of chain extenders and curing agents include: bisphenols, polyphenols, polyamines, polyamides, polyanhydrides, polyacids, and guanidine compounds. When the curable compound is a polyamine or polyol, then a preferred curing agent is a polyisocyanate.

The composition preferably contains about 0 to 0.7 equivalents of chain extender or curing agent per equivalent of curable compound, more preferably about 0 to 0.5 equivalents, and most preferably about 0 to 0.2 equivalents. The equivalent ratio of (curable compound):(the combination of first reactive groups on the dissociated network polymer and the curing agent and chain extender) is preferably at least about 0.5:1, more preferably at least about 0.7:1, and most preferably at least 0.9:1. The ratio is preferably no more than about 2:1, more preferably no more than about 1.5:1, and most preferably no more than about 1.2:1. The equivalent ratio of (curable compound):(first reactive groups on the dissociated network polymer) is preferably at least about 1:0.1, more preferably at least about 1:0.5, and most preferably at least about 1:0.7.

Compositions of the present invention preferably further contain a catalytic amount of catalyst which catalyzes the reaction of the curable compound and the network polymer. For example, when either the first or second reactive group is an epoxy group, then the catalyst is preferably a tertiary amine compound, a quaternary ammonium compound, a phosphine or phosphonium compound, an imidazole, oxazole or thiazole compound, or any of several other known epoxy curing catalysts. When the reactive groups are isocyanate groups and hydroxyl groups, then the catalyst is preferably a polyamine. When the network polymer is a polyanhydride and the curable compound is a polyol, then the catalyst is preferably an organotin compound. The optimum concentration of catalyst varies depending upon the reactive groups and the catalyst selected. However, in most cases, the concentration of catalyst is preferably about 0.01 to about 100 milliequivalents (meq) catalyst per equivalent of second reactive group.

Compositions of the present invention optionally further contain a solvent. Appropriate solvents vary widely depending upon the curable compound and the network polymer used. When the curable compound is an epoxy resin or when the reactive groups contain isocyanate groups, then the solvent is preferably a polar, aprotic organic solvent or an aromatic hydrocarbon. The solids content in the composition is preferably at least about 30 weight percent and more preferably at least about 50 weight percent. It is preferably no more than about 95 weight percent and more preferably no more than about 70 weight percent. When the curable compound is precipitated or isolated from a solvent, then the composition may also be used as powder coating or a neat solution.

Compositions of the present invention may optionally further contain numerous additives known to be useful for coatings and other uses. Examples of such additives include fillers, pigments, stabilizers, flow modifiers, wetting agents, latency generators, and the like. Except for fillers and pigments, such additives preferably make up 0 to 5 percent of the solids in the compositions by weight. Fillers and pigments preferably make up 0 to 60 weight percent of the solids in the composition.

(D) Use of Compositions to Coat Articles

Compositions which contain network polymers are preferably applied to a substrate and cured to form a coating. The substrate is preferably wood, plastic, concrete, or metal and is more preferably iron, steel, tin, or aluminum. Liquid compositions and solvent-borne compositions are preferably applied by spraying, rolling, or dipping. Solid powder compositions are preferably applied by fluidized bed or by electrostatic spraying. The composition is heated in contact with the substrate to a temperature at which it cures.

The optimum curing temperature varies depending upon the substrate and the components in the composition in a manner familiar to persons of ordinary skill in the art. The conditions must be sufficient to at least dissociate the dissociating moieties and cause reaction between the first and second reactive groups. In most cases, a preferred temperature is between about 25° C. and about 250° C. When the curable compound is an epoxy resin, the curing temperature is preferably at least about 20° C., more preferably at least about 60° C., and most preferably at least about 90° C.; and the curing temperature is preferably no more than about 250° C., more preferably no more than about 200° C., and most preferably no more than about 160° C. When the network polymer contains anhydride linking groups and the curable compound is a polyol, the curing temperature is preferably at least about 60° C., more preferably at least about 100° C., and most preferably at least about 125° C.; and the curing temperature is preferably no more than about 250° C., more preferably no more than about 200° C., and most preferably no more than about 180° C. When the reactive groups are isocyanate and hydroxyl groups, the curing temperature is preferably at least about 80° C., more preferably at least about 100° C. and most preferably at least about 120° C.; and the curing temperature is preferably no more than about 250° C. and more preferably no more than about 200° C. When the network polymer contains uretidinedione moieties, the temperature is preferably at least about 120° C. and more preferably at least about 150° C.

The resulting coated article contains a substrate and a coating of cured composition adhered directly or indirectly to the substrate. The coated article may optionally contain one or more primer layers between the substrate and the cured coating. It may also optionally contain one or more additional layers on top of the cured coating. The coating layer is preferably between about 0.2 mil (5 μm) and about 5 mil (130 μm) thick.

It has been observed with preferred components that when the curing temperature is continually increased compositions containing network polymers show reduced viscosity at a temperature 10° C. to 20° C. lower than equivalent compositions without the network polymer, and become non-flowing at a temperature 5° C. to 10° C. higher than equivalent compositions that do not contain the networks copolymer. It is theorized, without intending to be bound, that dissociation of the linking groups causes the molecular weight of the network polymer to decrease early in the reaction, thereby reducing the viscosity early in the reactions. Continuing dissociation holds the viscosity down through the end of the time period when ordinary compositions would be substantially non-flowing. These advantages are illustrated more fully in the following examples.

EXAMPLES

The following examples are for illustrative purposes only. They should not be taken as limiting the scope of either the specification or the claims.

EXAMPLES 1–7

Preparation of copolymers linked by anhydride moieties.

The following components are mixed (in the proportions shown in Table I) with 100 g of solution containing 4 to 6 weight percent ethyl 3,3-di-(t-amyl-peroxy)butyrate (sold as LUPERSOL™ 533–M75) in SC-100 aromatic solvent to make 900 g of solution: methacrylic anhydride (MAAn), n-butylacrylate (n-BA), n-butyl-methacrylate (n-BMA), styrene, and methylmethacrylate (MMA). A 900 gram quantity of the mixture is fed into a reaction vessel which contains SC-100 aromatic solvent at 142° C. to 161° C. over a 7 to 9 hour time frame. When addition is complete, the solid content is as shown in Table I.

TABLE I

Monomer Concentration Used In Preparation Of Network Copolymer

| Example | MAAn | N-BA | n-BMA | Styrene | MMA | Wt % Solids |
|---|---|---|---|---|---|---|
| 1 | 5.01 | 15.02 | 15.01 | 29.99 | 34.98 | 70.21 |
| 2 | 7.52 | 13.99 | 18.51 | 29.02 | 30.96 | 71.23 |
| 3 | 10.1 | 14.13 | 20.18 | 25.23 | 31.26 | 73.34 |
| 4 | 19.99 | 16.96 | 17.13 | 19.97 | 25.95 | 60.02 |
| 5 | 24.83 | 17.87 | 16.90 | 19.85 | 20.55 | 64.00 |
| 6 | 29.95 | 18.05 | 19.03 | 13.96 | 19.00 | 49.74 |
| 7 | 29.97 | 16.96 | 17.13 | 20.02 | 25.92 | 47.84 |

*MAAn, n-BA, n-BMA, and MMA are abbreviations for methacrylic anhydride, n-butyl acrylate, n-butyl methacrylate, and methyl methacrylate.

The resulting copolymers are analyzed by infrared spectroscopy. They show strong absorption at 1802 cm$^{-1}$ and a weaker absorption at 1782 cm$^{-1}$ and 1762 cm$^{-1}$. The results are consistent with a polymer that contains low quantities of 5-membered cyclic anhydride and high quantities of non-cyclic anhydride. The molecular weight of each example is measured by gel permeation chromatography using polystyrene standards at 35° C., tetrahydrofuran eluent, μ-STYRAGEL columns and a differential refractometer detector. The results are shown in Table II.

Anhydride groups in the network polymer are then hydrolyzed using water and hydrogen chloride, and the resulting product is esterified with trimethylsilyl diazomethane. The molecular weight is remeasured and shown in Table II. The significant reduction in $M_w$ and $M_z$ and in $M_w/M_n$ caused by hydrolysis shows that polymer chains are linked together by anhydride moieties. Hydrolysis of cyclic anhydrides in the backbone of a polymer would not cause the molecular weight of the polymer to go down substantially. The glass transition temperature for each example is also measured using differential scanning calorimetry, and the Brookfield viscosity of each example is measured at 40 percent solids in SC-100 aromatic solvent using a Brookfield LVT model viscometer. The results of these tests are all shown in Table II.

TABLE II

| Example | Tg, °C. | Brookfield Viscosity, cps* | Before Hydrolysis | | | | After Hydrolysis | | | |
|---|---|---|---|---|---|---|---|---|---|---|
| | | | Mn | Mw | Mz | Mw/Mn | Mn | Mw | Mz | Mw/Mn |
| 1 | 28.5 | 28.96 | 1821 | 7377 | 19700 | 4.05 | 1967 | 3476 | 5581 | 1.77 |
| 2 | 23.5 | 28.51 | 1686 | 8179 | 23107 | 4.85 | 1700 | 2918 | 4698 | 1.72 |
| 3 | 25.7 | 30.98 | 1624 | 8487 | 25572 | 5.23 | 1667 | 2756 | 4344 | 1.65 |
| 4 | 31.3 | 141.2 | 1640 | 16791 | 83716 | 10.235 | 1176 | 3316 | 7901 | 2.82 |
| 5 | 40.6 | 343.2 | 1650 | 19345 | 71108 | 1173 | 1254 | 2885 | 5076 | 2.30 |
| 6 | 26.1 | 33.7 | 1468 | 10713 | 37901 | 7.3 | 914 | 2199 | 4303 | 2.40 |
| 7 | 40.2 | 110 | 2064 | 50816 | 248587 | 24.6 | 1162 | 3116 | 5945 | 2.68 |

*cps is an abbreviation for centipoise; viscosity measured at 40% solids.
bNetwork copolymer prepared with 4 wt % initiator. Other network copolymer prepared with 6 wt % initiator.

EXAMPLE 8

Composition of Network Polymer with Epoxy Resins and Resulting Coatings

The network polymer from Example 6 is formulated into two compositions. Composition A contains 28.48 g of glycidyl methacrylate-acrylic acid copolymer, 50 g of network polymer and 21.61 g of DOWANOL PM* acetate solvent (*—trademark of The Dow Chemical Company). Composition B contains 12.1 g of bis(glycidyl ester) of 1,2-cyclohexanedicarboxylic acid, 50 g of network polymer and 21.61 g of DOWANOL PM* acetate solvent. Each composition is stored for 14 days at a temperature of about 38° C., and the Zahn No. 2 cup viscosity is tested periodically. The results are shown in Table III. The 1-K stability of each composition as shown in Table III is very good. Benzyltriphenyl-phosphonium chloride catalyst is added to Composition B. The composition is applied to zinc phosphated cold-roll steel panels and cured at 140° C. for 30 minutes. The coating that results withstands more than 100 MEK double rubs.

TABLE III

Viscosity In Accelerated Aging Test

| Sample | Epoxide Type | Wt. Ratio Epoxy: Anhydride | Zahn #2 Cup Viscosity (sec.) at | | | | |
|---|---|---|---|---|---|---|---|
| | | | 1 days | 5 days | 7 days | 10 days | 14 days |
| 6(A) | GMA Copolymer | 28.48:50 | 32.45 | 34.01 | 38.49 | 43.47 | 48.73 |
| 6(B) | Resin | 12.1:50 | 27.96 | 28.71 | 29.42 | 35.81 | 39.62 |

EXAMPLE 9

Composition of Network Polymer with Solid Epoxy Resins to Make Powder Coating Compositions and Resulting Coatings A 72 weight percent quantity of network polymer from Example 4 as powder isolated by precipitation with hexane is formulated with 25 weight percent ALMATEX PD-7610 glycidyl methacrylate/acrylic copolymer resin, and 3 weight percent benzyltriphenylphosphonium chloride catalyst. The powder coating composition was tested for cure rheology at a temperature from 70° C. to 180° C. and a temperature increase of 7° C. per minute using RHEOLAB MC20™ equipment (made by Physica Corp.). The composition shows a relatively slow decrease in viscosity from about 95° C. to about 140° C. and then a sharper increase in viscosity from about 140° C. to about 150° C. In comparison, the standard co-curing curve of a similar composition containing dodecanedioic acid shows a very sharp increase in viscosity from 110° C. to 120° C., a relatively stable viscosity to 138° C., and then a very sharp increase in viscosity from 138° C. to 142° C. The experiment shows that powder compositions of the present invention have a broader processing window than similar commercially available compositions.

EXAMPLE 10

Composition of Network Polymer with Polyol and Resulting Coating

An acrylic polyol is made by reacting 35 weight percent hydroxyethylacrylate, 15 weight percent methylmethacrylate, 15 weight percent styrene and 35 weight percent N-butylacrylate. A composition is made containing 61.3 weight percent network polymer from Example 4, 38.7 weight percent (0.06 equivalents) of the acrylic polyol resin and 0,077 weight percent FASCAT 4202 catalyst, dissolved in SC-100 aromatic solvent at a concentration of 14.7 percent solids. The composition is applied to zinc phosphated cold-rolled steel using No. 22 and No. 34 draw-down bars. The compositions are cured for 30 minutes, 1 hour and 2 hours at 238° C. The solvent resistance of each composition is tested using the MEK double rub test. The results are shown in Table IV.

TABLE IV

| Sample | Oven Time (min) | No. 22 Bar | | No. 34 Bar | |
|---|---|---|---|---|---|
| | | Thickness (mils) | MEK Double Rubs | Thickness (mils) | MEK Double Rubs |
| (A) | 30 | 0.419 | 30 | 0.542 | 25 |
| (B) | 60 | 0.385 | 100 | 0.432 | 140 |
| (C) | 120 | 0.275 | >250 | 0.517 | >250 |

EXAMPLE 11

Powder Coating Formulation Containing Network Polymer

Network Polymer Preparation

A first mixture of vinyl monomers is prepared by mixing 160.33 g of methacrylic anhydride, 209.78 g of methyl methacrylate, 136.06 g of n-butyl acrylate, 136.62 g of n-butyl methacrylate and 165.38 g of styrene. A second mixture is prepared containing 64.11 g of LUPERSOL 533-M75 initiator and 57.3 g of SC-100 solvent. A 679.2 g quantity of SC-100 aromatic solvent is heated to 144° C. in a stirred reaction vessel. After the reactor is purged with nitrogen, the solutions of vinyl monomers and initiator are pumped into the reactor with a syringe pump over a period of 8 hr. and 20 min. The polymerization temperature is between 137° C. and 145° C. When addition of the reactants is completed, the reaction mixture is held for 48 min. at 145° C. and followed by the addition of 1 mL of LUPERSOL 533-M75 initiator. The reaction mixture is then allowed to cool to room temperature.

Approximately 682 grams of the reaction mixture is added slowly, with stirring, to 1100 grams of hexane. The network polymer coagulates, and the hexane is decanted. The resulting viscous liquid is spread out in a glass tray, covered with aluminum foil containing holes, and then dried under vacuum (1–2 mm Hg) at 60° C. for at least 24 hr. Using a manual grinder, the resulting solid is ground to a white powder. The theoretical anhydride equivalent weight is 781.

Powder Coating Formulations

The dried network polymer is dry-blended with ALMA-TEX PD-7610 glycidyl methacrylate-acrylic copolymer resin and RESIFLOW P-67 flow modifier. The blend is melt mixed in a Buss Condux PLK-46 single-screw extruder under the following conditions:

Zone 1 (next to feed zone)-70° C.

Zone 2 (next to outlet)-70° C.

Screw interior-70° C.

Screw Speed-250 rpm

As a comparative, a similar formulation is melt blended using dodecanedioic acid (DDDA) in place of the network polymer. The formulations are shown in Table V.

TABLE V

Dodecanedioic Acid and Anhydride Powder Formulations

| Reagents | DDDA* | Network Polymer |
| --- | --- | --- |
| DDDA/ Network Polymer (g) | 18 | 59 |
| ALMATEX PD7610 (g) | 82 | 41 |
| RESIFLOW-P-67 (g) | 0.8 | 0.8 |
| Total (g) | 100.8 | 100.8 |

*Not an example of the invention

The extrudate is ground and sieved with 150-mesh brass sieves (105 micron opening).

The ground and sieved formulations are bagged in plastic and taped shut. They are applied to 4"×12"×0.032" polished, untreated, cold-rolled steel panels using a Wagner EPB electrostatic spray gun with 70 kilovolts applied. The panels are baked at about 330° F. (165° C.) for 20 minutes. The properties of the resulting coating are set out in Table VI.

TABLE VI

Summary of Powder-Coating Performance

| | DDDA* | Network Polymer |
| --- | --- | --- |
| Gel Time at 330° F. | 119 sec. | 140 sec. |
| [a]Thickness (mils) | 2.1–2.3 | 2.1–2.3 |
| 60° Gloss | 122 | 119 |
| 20° Gloss | 102 | 92 |
| BYK Wave Scan: | | |
| Mean Rating | 5.5 | 2.7 |
| Longwave | 18.7 | 49.3 |
| Shortwave | 0.4% | 0.4% |
| [b]Thickness (mils) | 1.2–1.5 | 2.1–2.3 |
| Pencil Hardness | HB Pass | HB Pass |
| [c]Thickness (mils) | 1.5–2.0 | 1.8–1.9 |
| MEK DR | 120 Pass | 80 Pass |

[a]Thickness of coatings used in gloss and wave scan measurements.
[b]Thickness of coatings used in hardness testing.
[c]Thickness of coatings used in MEK double rub test.
*Not an example of the Invention

What is claimed is:

1. A network polymer comprising:
   (1) a plurality of polymer chains which are derived from one or more ethylenically-unsaturated monomers; and
   (2) one or more linking groups, which: (a) contain anhydride, carbonate or uretidinedione moieties and (b) link two polymer chains,
wherein the network polymer: (A) contains less than 0.5 equivalents of pendant carboxylic acid per equivalent of anhydride moiety when the linking group contains anhydride moiety and (B) is soluble up to at least 20 weight percent in at least one aromatic or aprotic polar organic solvent and (C) has an average weight per equivalent of linking anhydride, carbonate or uretidinedione moieties of no more than about 5,000.

2. The network polymer of claim 1 wherein the linking groups contain anhydride moieties.

3. The network polymer of claim 2 wherein the linking group is represented by the following structural formula:

FORMULA III(b)

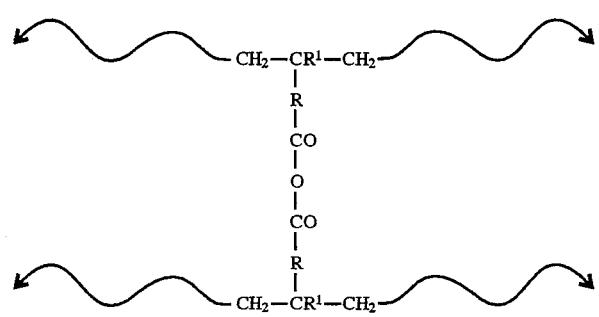

4. The network polymer of claim 2 which has a weight average molecular weight of about 2000 to about 100,000.

5. The network polymer of claim 4 which dissociates to provide a polymer having a weight average molecular weight of about 500 to about 5000.

6. The network polymer of claim 2 wherein the polymer chains contain predominantly one or more of the following monomers: ethylene, propylene, butylene, styrene, vinyltoluene, vinyl chloride, vinylidene chloride, 4-vinylanisole, acrylonitrile, vinyl oxazoline, vinyl acetate, vinyl propionate, n-butyl vinyl ether, lauryl vinyl ether, methyl acrylate, ethyl acrylate, n-propyl acrylate, isopropyl acrylate, butyl acrylate, hexyl acrylate, octyl acrylate, nonyl acrylate, decyl acrylate, lauryl acrylate, benzyl acrylate, cyclohexyl acrylate, methyl methacrylate, ethyl methacrylate, propyl methacrylate, isopropyl methacrylate, n-butyl methacrylate, hexyl methacrylate, octyl methacrylate, nonyl methacrylate, decyl methacrylate, lauryl methacrylate, benzyl methacrylate, cyclohexyl methacrylate, or methyl crotonate.

7. The network polymer of claim 1 wherein the linking groups contain uretidinedione moieties.

8. The network polymer of claim 7 wherein the linking group also contains divalent organic moieties which join the uretidinedione moieties to the polymer chains.

9. The network polymer of claim 8 which has a weight average molecular weight of about 2000 to about 100,000.

10. The network polymer of claim 9 which dissociates to provide a polymer having a weight average molecular weight of about 500 to about 5000.

11. The network polymer of claim 7 wherein the polymer chains contain predominantly one or more of the following monomers: ethylene, propylene, butylene, styrene, vinyltoluene, vinyl chloride, vinylidene chloride, 4-vinylanisole, acrylonitrile, vinyl oxazoline, vinyl acetate, vinyl propionate, n-butyl vinyl ether, lauryl vinyl ether, methyl acrylate, ethyl acrylate, n-propyl acrylate, isopropyl acrylate, butyl acrylate, hexyl acrylate, octyl acrylate, nonyl acrylate, decyl acrylate, lauryl acrylate, benzyl acrylate, cyclohexyl acrylate, methyl methacrylate, ethyl methacrylate, propyl methacrylate, isopropyl methacrylate, n-butyl methacrylate, hexyl methacrylate, octyl methacrylate, nonyl methacrylate, decyl methacrylate, lauryl methacrylate, benzyl methacrylate, cyclohexyl methacrylate, or methyl crotonate.

12. The network polymer of claim 1 wherein the linking groups contain carbonate moieties.

13. The network polymer of claim 12 wherein the linking group also contains divalent organic moieties which join the carbonate moieties to the polymer chains.

14. The network polymer of claim 13 which has a weight average molecular weight of about 2000 to about 100,000.

15. The network polymer of claim 14 which dissociates to provide a polymer having a weight average molecular weight of about 500 to about 5000.

16. The network polymer of claim 12 wherein the polymer chains contain predominantly one or more of the following monomers: ethylene, propylene, butylene, styrene, vinyltoluene, vinyl chloride, vinylidene chloride, 4-vinylanisole, acrylonitrile, vinyl oxazoline, vinyl acetate, vinyl propionate, n-butyl vinyl ether, lauryl vinyl ether, methyl acrylate, ethyl acrylate, n-propyl acrylate, isopropyl acrylate, butyl acrylate, hexyl acrylate, octyl acrylate, nonyl acrylate, decyl acrylate, lauryl acrylate, benzyl acrylate, cyclohexyl acrylate, methyl methacrylate, ethyl methacrylate, propyl methacrylate, isopropyl methacrylate, n-butyl methacrylate, hexyl methacrylate, octyl methacrylate, nonyl methacrylate, decyl methacrylate, lauryl methacrylate, benzyl methacrylate, cyclohexyl methacrylate, or methyl crotonate.

17. A process to make a network polymer, comprising the step of polymerizing:
(a) one or more ethylenically-unsaturated monomers
(b) in the presence of one or more linking compounds, which contain at least two ethylenically-unsaturated aliphatic moieties linked by anhydride, carbonate, or uretidinedione moieties, under starved reaction conditions, wherein the weight ratio of linking monomers to other monomers is at least about 5:95.

18. The network polymer of claim 1 wherein the average weight of the network polymer per equivalent of anhydride, carbonate or uretidinedione moieties is no more than about 2000.

19. The network polymer of claim 18 wherein the average weight of the network polymer per equivalent of anhydride, carbonate or uretidinedione moieties is no more than about 1,000.

20. The network polymer of claim 18 wherein at least 5 percent of the repeating units on the polymer chains are bonded to linking groups (L).

21. The process of claim 17 wherein the ethylenically-unsaturated monomers contain any one or more of: lower ($C_1$–$C_6$) alkenes, vinyl chloride, vinyl acetate, vinylidene chloride, styrenic monomers, acrylic or methacrylic acid, esters of acrylic or methacrylic acid nitriles of acrylic or methacrylic acid, or amides of acrylic or methacrylic acid.

22. The process of claim 17 wherein the ethylenically-unsaturated monomers contain any one or more of: propylene, butylene styrene, vinyltoluene, vinyl chloride, vinylidene chloride, 4-vinylanisole, acrylonitrile, vinyl oxazoline, vinyl acetate, vinyl propionate, n-butyl vinyl ether, lauryl vinyl ether, methyl acrylate, ethyl acrylate, n-propyl acrylate, isopropyl acrylate, butyl acrylate, hexyl acrylate, octyl acrylate, nonyl acrylate, decyl acrylate, lauryl acrylate, benzyl acrylate, cyclohexyl acrylate, methyl methacrylate, ethyl methacrylate, propyl methacrylate, isopropyl methacrylate, n-butyl methacrylate, hexyl methacrylate, octyl methacrylate, nonyl methacrylate, decyl methacrylate, lauryl methacrylate, benzyl methacrylate, cyclohexyl methacrylate or methyl crotonate.

23. The process of claim 17 wherein the dissociating moiety in the linking monomer is any of: anhydride moieties, carbonate moieties, uretidinedione moieties, peroxide moieties, disulfide moieties, sulfate diester moieties, siloxy moieties, phosphonic diester moieties, carbonate anhydride moieties, N-hydroxyl imide moieties, keteneacetal moieties, metal carboxylate moieties, or combinations thereof.

24. The process of claim 17 wherein the dissociating moiety in the linking monomer is an anhydride moiety.

25. The process of claim 17 wherein the dissociating moiety in the linking monomer is a carbonate moiety.

26. The process of claim 17 wherein the dissociating moiety in the linking monomer is an uretidinedione moiety.

27. The process of claim 17 wherein the weight ratio of linking monomers to ethylenically-unsaturated monomers is from about 15:85 to about 60:40.

28. The process of claim 17 wherein the weight ratio of linking monomers to ethylenically-unsaturated monomers is from about 30:70 to about 60:40.

29. The process of claim 17 wherein the molar ratio of linking monomers to ethylenically-unsaturated monomers is from about 1:10 to about 1:1.

* * * * *